US012113478B1

(12) United States Patent
Huang et al.

(10) Patent No.: US 12,113,478 B1
(45) Date of Patent: Oct. 8, 2024

(54) FOLDABLE COVER PLATE AND MOVABLE DEVICE

(71) Applicant: Shenzhen WKSP Power Technology Co., Ltd., Shenzhen (CN)

(72) Inventors: Houwei Huang, Shenzhen (CN); Shengwen Hong, Shenzhen (CN); Xiaohong Yang, Shenzhen (CN); Qu Zhang, Shenzhen (CN); Yaping Xu, Shenzhen (CN)

(73) Assignee: Shenzhen WKSP Power Technology Co., Ltd., Shenzhen (CN)

( * ) Notice: Subject to any disclaimer, the term of this patent is extended or adjusted under 35 U.S.C. 154(b) by 0 days.

(21) Appl. No.: 18/431,576

(22) Filed: Feb. 2, 2024

(30) Foreign Application Priority Data

Jan. 17, 2024 (CN) .......................... 202420118838.X (51) Int. Cl.
*H02S 40/38* (2014.01)
*B62D 33/04* (2006.01)
*H02S 30/20* (2014.01)
*H02S 40/36* (2014.01)

(52) U.S. Cl.
CPC ............ *H02S 40/38* (2014.12); *B62D 33/044* (2013.01); *H02S 30/20* (2014.12); *H02S 40/36* (2014.12)

(58) Field of Classification Search
CPC ...................................................... H02S 10/40
See application file for complete search history.

(56) References Cited

U.S. PATENT DOCUMENTS

| 2013/0015678 A1* | 1/2013 | Williamson | ........... B60J 7/1607 296/100.09 |
| 2023/0158871 A1* | 5/2023 | Rossi | .................... B08B 7/0028 296/100.09 |
| 2023/0173898 A1* | 6/2023 | Dawson | ................ B60R 16/033 296/100.06 |

OTHER PUBLICATIONS

SolarReviews, "How to wire solar panels in series vs. parallel", 2020, https://www.solarreviews.com/blog/do-you-wire-solar-panels-series-or-parallel, All Pages. (Year: 2020).*
Noe, "Yea or Nay? A Solar-Power-Harvesting Pickup Truck Tonneau Cover", https://www.core77.com/posts/102016/Yea-or-Nay-A-Solar-Power-Harvesting-Pickup-Truck-Tonneau-Cover, All Pages, 2020. (Year: 2020).*

* cited by examiner

*Primary Examiner* — Daniel P Malley, Jr.
(74) *Attorney, Agent, or Firm* — Scully, Scott, Murphy & Presser, P.C.

(57) ABSTRACT

A foldable cover plate is configured to be mounted to a tailstock of the movable device to cover or open an opening provided with the tailstock, and includes a plurality of cover assemblies rotationally connected in sequence. each of the plurality of cover assemblies includes a photovoltaic panel and a substrate. the photovoltaic panel of each of the plurality of cover assemblies is arranged on an associated substrate. The photovoltaic panel is configured to absorb light energy and convert the light energy to electrical energy. Any two adjacent cover assemblies of the plurality of cover assemblies are electrically connected to each other; and in a connection direction of the plurality of cover assemblies, a one-end cover assembly of the plurality of cover assemblies is configured to be electrically connected to an energy storage device arranged in the tailstock to charge the energy storage device.

2 Claims, 6 Drawing Sheets

FOLDABLE COVER PLATE AND MOVABLE DEVICE

CROSS-REFERENCE TO RELATED APPLICATION

The present disclosure claims priority to and the benefit of Chinese Application Patent No. 202420118838.X, filed on Jan. 17, 2024, the entire disclosure of which is hereby incorporated by reference in its entirety.

TECHNICAL FIELD

The present disclosure relates to the technical field of cover plates, in particular to a foldable cover plate and a movable device.

BACKGROUND

Pickup trucks and other movable devices includes a tailstock configured to carry a wide variety of goods, such as food, various equipment, and materials. Since a top of the tailstock is provided with an opening, the goods in the tailstock are susceptible to environmental factors such as rain and dust, and the goods are not safe and are easily stolen. Therefore, a foldable cover plate is often configured to cover the opening provided at the top of the tailstock and open the opening by folding the foldable cover plate when needed. In a related art, functions of the foldable cover plates are relatively single.

SUMMARY

Based on this, a first aspect of the present disclosure provides a foldable cover plate, which is configured to be mounted to a tailstock of a movable device to cover or open an opening provided with the tailstock. The foldable cover plate includes a plurality of cover assemblies rotationally connected in sequence. Each of the plurality of cover assemblies comprises a photovoltaic panel and a substrate. The photovoltaic panel of each of the plurality of cover assemblies is arranged on an associated substrate. The photovoltaic panel of each of the plurality of cover assemblies is configured to absorb light energy and convert the light energy to electrical energy. Any two adjacent cover assemblies of the plurality of cover assemblies are electrically connected to each other. In a connection direction of the plurality of cover assemblies, a one-end cover assembly of the plurality of cover assemblies is configured to be electrically connected to an energy storage device arranged in the tailstock to charge the energy storage device.

The foldable cover plate provided in the first aspect of the present application can cover the opening of the tailstock by utilizing the rotation function of the cover assembly, and can be folded to open the opening when needed. Moreover, each of the plurality of cover assemblies of the present application may also be provided with the photovoltaic panel and the substrate, the photovoltaic panel can be configured to absorb light energy and convert the light energy to electrical energy, such that the foldable cover plate can not only cover the tailstock, but also realize photovoltaic conversion, and the converted electric energy can be charged to the energy storage device arranged in the tailstock, thus realizing the function of charging.

As above, the foldable cover plate provided by the present application can simultaneously realize the functions of shading and charging, and thereby diversifying the functions of the foldable cover plate.

In a possible embodiment, the connection direction of the plurality of cover assemblies is defined as an arrangement direction of a cockpit of the movable device and the tailstock, and the one-end cover assembly of the plurality of cover assemblies is arranged at an end away from the cockpit, and configured to be electrically connected to the energy storage device.

In a possible embodiment, an another-end cover assembly of the plurality of cover assemblies arranged at an end adjacent to the cockpit is configured to be electrically connected to a movable solar panel.

In a possible embodiment, one side of the substrate of each of the plurality of cover assemblies back from an associated photovoltaic panel is provided with an interface electrically connected to the associated photovoltaic panel, the foldable cover plate further includes at least one first conductor component and an second conductor component, two opposite ends of each of the at least one first conductor component are configured to be electrically connected to two associated interfaces of the any two adjacent cover assemblies, respectively; one end of the second conductor component is electrically connected to the interface of the one-end cover assembly, and an another end of the second conductor component is configured to be electrically connected to the energy storage device.

In a possible embodiment, each of the at least one first conductor component includes a first conductor and a second conductor, one end of the first conductor is connected to the interface of one of the any two adjacent cover assemblies, an another end of the first conductor is connected to the second conductor, and one end of the second conductor away from the first conductor is connected to the interface of an another one of the any two adjacent cover assemblies.

In a possible embodiment, the foldable cover plate further includes a third conductor component, one end of the third conductor component is electrically connected to the interface of the another-end cover assembly, and an another end of the third conductor component is electrically connected to the movable solar panel.

In a possible embodiment, the third conductor component is configured to be electrically connected to the movable solar panel by an electrical connecting line.

In a possible embodiment, the third conductor component is configured to be detachably connected to the electrical connecting line.

In a possible embodiment, the second conductor component includes a third conductor and a fourth conductor, one end of the third conductor is electrically connected to the interface of the one-end cover assembly, an another end of the third conductor is electrically connected to the fourth conductor, and one end of the fourth conductor away from the third conductor is configured to be electrically connected to the energy storage device.

In a possible embodiment, the first conductor of each of the at least one first conductor component is non-detachably connected to an associated second conductor; or, the first conductor of each of the at least one first conductor component is detachably connected to an associated second conductor; and the second conductor assembly is configured to be detachably connected to the energy storage device.

In a possible embodiment, the any two adjacent cover assemblies are detachably connected to each other.

A second aspect of the present disclosure provides a movable device, including a cockpit, a tailstock, an energy storage device, and the foldable cover plate provided by the first aspect of the present disclosure. The foldable cover plate is mounted to the tailstock, and the foldable cover plate is electrically connected to the energy storage device to charge the energy storage device.

The foldable cover plate provided in the first aspect of the present application is applied to the movable device is provided in the second aspect of the present application. Thus, the movable device may not only utilize the foldable cover plate to achieve the function of covering the tailstock, but may also utilize the foldable cover plate to achieve photovoltaic conversion so as to charge the energy storage device in the tailstock, thereby diversifying the functions of the foldable cover plate.

In a possible embodiment, the energy storage arranged one side of the tailstock away from the cockpit; the connection direction of the plurality of cover assemblies is defined as an arrangement direction of the cockpit and the tailstock, the one-end cover assembly of the plurality of cover assemblies is arranged at an end away from the cockpit, and configured to be electrically connected to the energy storage device.

In a possible embodiment, the movable device further includes a movable solar panel; an another-end cover assembly of the plurality of cover assemblies arranged at an end adjacent to the cockpit is electrically connected to the movable solar panel.

In a possible embodiment, one side of the substrate of each of the plurality of cover assemblies back from an associated photovoltaic panel is provided with an interface configured to be electrically connected to the associated photovoltaic panel, the foldable cover plate further includes at least one first conductor component and an second conductor component, two opposite ends of each of the at least one first conductor component are configured to be electrically connected to two associated interfaces of the any two adjacent cover assemblies, respectively; one end of the second conductor component is electrically connected to the interface of the one-end cover assembly, and an another end of the second conductor component is configured to be electrically connected to the energy storage device.

In a possible embodiment, each of the at least one first conductor component comprises a first conductor and a second conductor, one end of the first conductor is connected to the interface of one of the any two adjacent cover assemblies, an another end of the first conductor is connected to the second conductor, and one end of the second conductor away from the first conductor is connected to the interface of an another one of the any two adjacent cover assemblies.

In a possible embodiment, the one-end cover assembly is detachably connected to the energy storage device; the any two adjacent cover assemblies are detachably connected to each other, or the any two adjacent cover assemblies are non-detachably connected to each other.

In a possible embodiment, the foldable cover plate further includes a third conductor component, one end of the third conductor component is electrically connected to the interface of the another-end cover assembly, and an another end of the third conductor component is electrically connected to the movable solar panel.

In a possible embodiment, the movable device further includes an electrical connecting line, the electrical connecting line is electrically connected between the third conductor component and the movable solar panel.

In a possible embodiment, the electrical connecting line is detachably connected to the third conductor component.

BRIEF DESCRIPTION OF THE DRAWINGS

In order to more clearly illustrate the technical solutions in the embodiments of the present application, the accompanying drawings to be used in the embodiments of the present application will be described below.

Description of the reference signs: movable device—1, cockpit—1a, tailstock—1b, opening—101b, side wall—11b, foldable cover plate—2, energy storage device—3, movable solar panel—4, electrical connecting line—5, cover assembly—10, one-end cover assembly—10a, middle cover assembly—10b, another-end cover assembly—10c, photovoltaic panel—11, substrate—12, interface—13, first conductor component—21, first conductor—211, second conductor—212, second conductor component—22, third conductor—221, fourth conductor—222, third conductor component—23.

DETAILED DESCRIPTION

The following are preferred embodiments of the present application, and it should be noted that for a person of ordinary skill in the art, a number of improvements and embellishments may be made without departing from the principles of the present application, which are also regarded as the scope of protection of the present application.

Figure 1:
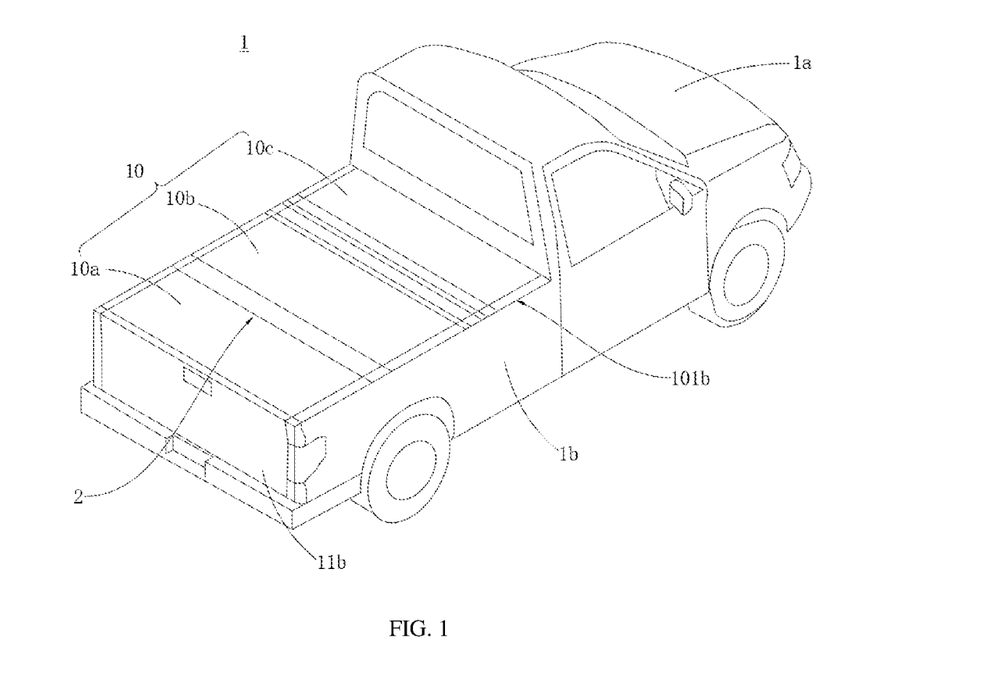
FIG. 1 is a schematic view of a foldable cover plate in an embodiment of the present application when applied to a movable device.
Figure 2:
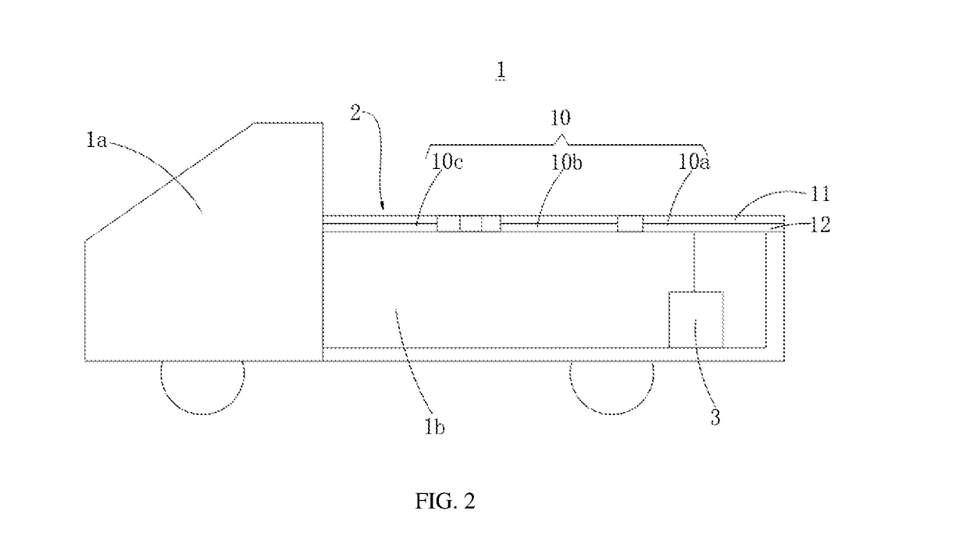
FIG. 2 is a schematic view of a cross-section of the foldable cover plate of FIG. 1 when it is applied to the movable device.
Figure 3:
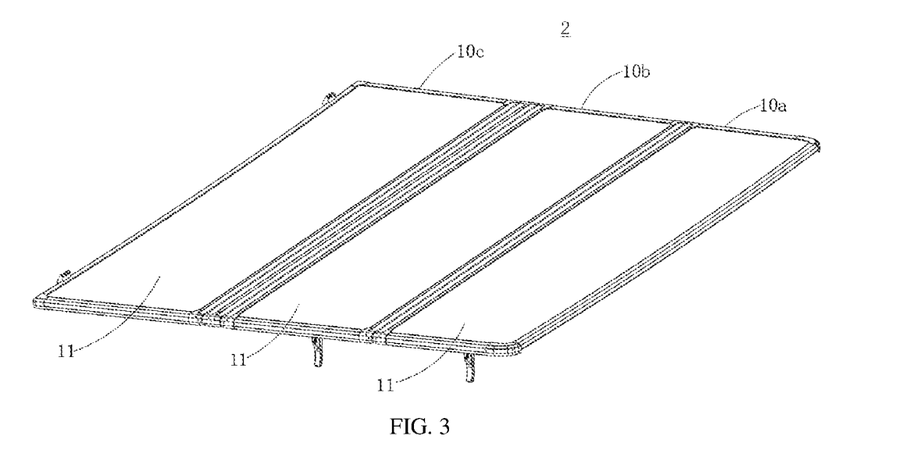
FIG. 3 is a schematic view of a three-dimensional structure of the foldable cover plate in an embodiment of the present application.
Figure 4:
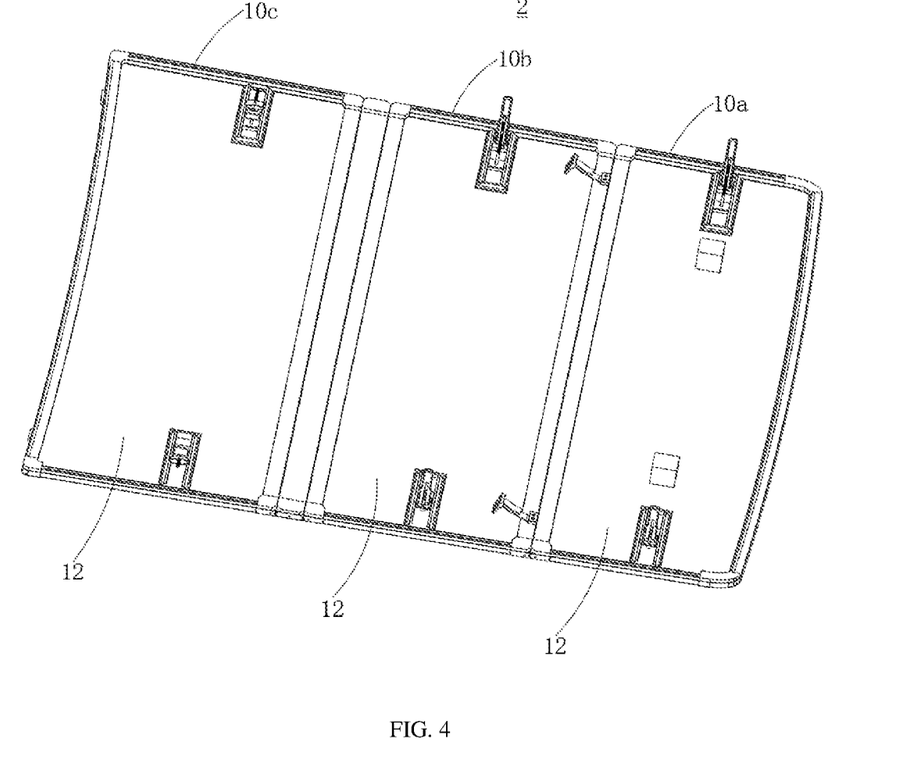
FIG. 4 is a schematic view of the three-dimensional structure of the foldable cover plate shown in FIG. 3 in another view.
Figure 5:
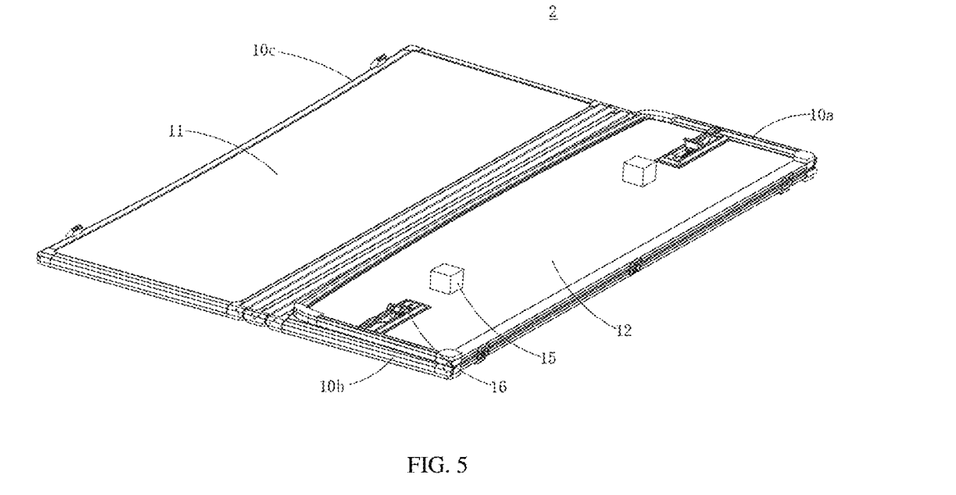
FIG. 5 is a schematic view of one of cover assemblies of the foldable cover plate shown in FIG. 3 when folded.
Figure 6:
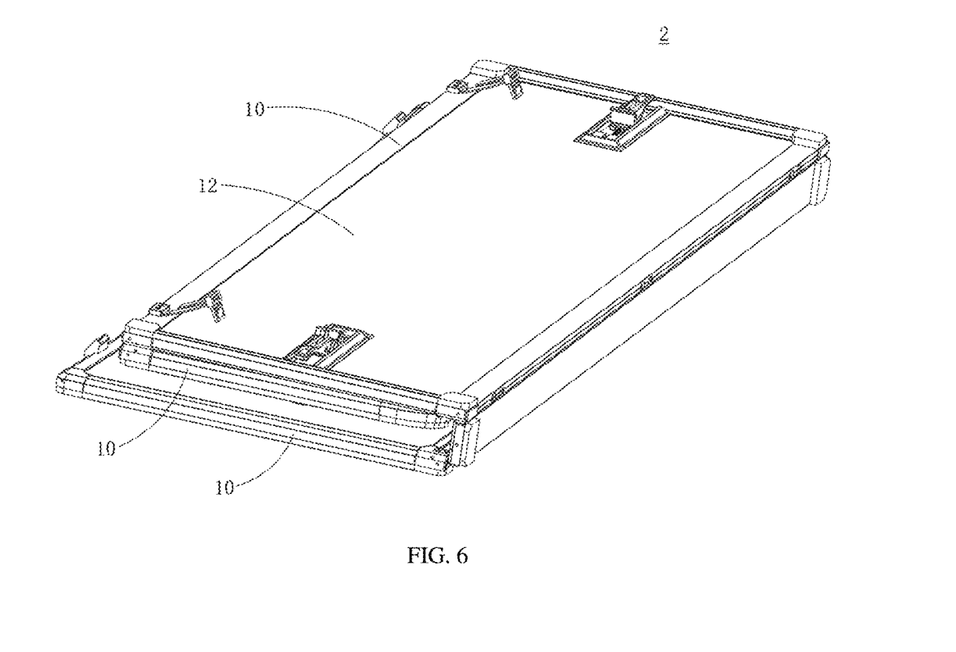
FIG. 6 is a schematic view of the foldable cover plate of FIG. 3 when two cover assemblies are folded.

As illustrated in FIG. 1 to FIG. 6, FIG. 1 is a schematic view of a foldable cover plate in an embodiment of the present application when applied to a movable device. FIG. 2 is a schematic view of a cross-section of the foldable cover plate of FIG. 1 when it is applied to the movable device. FIG. 3 is a schematic view of a three-dimensional structure of the foldable cover plate in an embodiment of the present application. FIG. 4 is a schematic view of the three-dimensional structure of the foldable cover plate shown in FIG. 3 in another view. FIG. 5 is a schematic view of one of cover assemblies of the foldable cover plate shown in FIG. 3 when folded. FIG. 6 is a schematic view of the foldable cover plate of FIG. 3 when two cover assemblies are folded.

A foldable cover plate 2 provided in an embodiment of the present application is configured to be mounted to a tailstock 1b of a movable device 1 to cover or open an opening 101b provided with the tailstock 1b. The foldable cover plate 2 includes a plurality of cover assemblies 10 rotationally connected in sequence. Each of the plurality of cover assemblies 10 includes a photovoltaic panel 11 and a substrate 12. The photovoltaic panel 11 of each of the plurality of cover assemblies 10 is arranged on an associated substrate 12. The photovoltaic panel 11 of each of the plurality of cover assemblies 10 is configured to absorb light energy and convert the light energy to electrical energy; any two adjacent cover assemblies 10 of the plurality of cover assemblies 10 are electrically connected to each other. In a connection direction of the plurality of cover assemblies 10, a one-end cover assembly 10a of the plurality of cover assemblies 10 is configured to be electrically connected to an energy storage device 3 arranged in the tailstock 1b to charge the energy storage device 3.

The foldable cover plate 2 is configured as a foldable and rotatable cover plate. The foldable cover plate 2 is composed of the plurality of cover assemblies 10 rotationally connected in sequence, thus realizing the folding function of the foldable cover plate 2 by folding the plurality of cover assemblies 10. Therefore, the foldable cover plate 2 includes an unfolded state and a folded state. The unfolded state refers to a state in which the plurality of cover assemblies 10 are unfolded. The folded state refers to a state in which the plurality of cover assemblies 10 are folded. Moreover, a different number of cover assemblies 10 to be folded would result in the foldable cover plate 2 having a number of different folded states.

The movable device 1 includes, but is not limited to, pickup trucks, trucks, box vans, snowmobiles, and other vehicles having the open tailstock 1b. The foldable cover plate 2 is capable of arranging on a vehicle side of the tailstock 1b, such that when the foldable cover plate 2 is in the unfolded state, the foldable cover plate 2 is capable of covering the opening 101b of the tailstock 1b, thus effectively protecting the goods in the tailstock 1b. When the foldable cover plate 2 is in the folded state, the foldable cover plate 2 is capable of opening the opening 101b of the tailstock 1b, which is convenient for a user to pick and place the goods in the tailstock 1b. Specifically, when at least one of the plurality of cover assemblies 10 is folded over to another of the plurality of cover assemblies 10, the foldable cover plate 2 may open the opening 101b of the open tailstock 1b to varying degrees, which may be folded by the user as desired. For example, the foldable cover plate 2 is illustrated schematically in an embodiment and below as including three cover assemblies 10. The three cover assemblies 10 includes a one-end cover assembly 10a, a middle cover assembly 10b, and an another-end cover assembly 10c. The one-end cover assembly 10a, the middle cover assembly 10b, and the another-end cover assembly 10c are rotationally connected in sequence in the connection direction of the plurality of cover assemblies 10. The one-end cover assembly 10a arranged at a rear end of the tailstock 1b, that is, the one-end cover assembly 10a away from a cockpit 1a of the movable device 1, is capable of rotating to allow the one-end cover assembly 10a to be lapped on the middle cover assembly 10b to expose the opening 101b of the tailstock 1b, thus easy to pick and place the goods. Furthermore, the middle cover assembly 10b is also capable of rotating to allow the middle cover assembly 10b and the one-end cover assembly 10a arranged at the rear end of the tailstock 1b to be lapped on the another-end cover assembly 10b arranged adjacent to the cockpit 1a together to expose more areas of the opening 101b of the tailstock 1b, thus easy to pick and place the volume and larger quantity of goods.

In the related art, each of the plurality of cover assemblies includes only the substrate, thus realizing functions of covering and opening the opening 101b of the tailstock. However, the foldable cover plate has a single function and fails to meet the needs of the user. Therefore, in the embodiment, the cover assembly 10 adds a photovoltaic panel 11, i.e. a solar panel, on a top of the substrate 12. The substrate 12 is mainly configured to support the photovoltaic panel 11. The photovoltaic panel 11 can be absorbed light energy and converted the light energy to electrical energy, thus realizing photoelectric conversion. When the foldable cover plate 2 is in the unfolded state, the photovoltaic panel 11 is arranged facing upwards to better receive light energy, such as sunlight. Since the foldable cover plate 2 includes the plurality of cover assemblies 10, and each of the plurality of cover assemblies 10 includes the photovoltaic panel 11, two adjacent cover assemblies 10 can be electrically connected to each other, that is, two adjacent photovoltaic panels 11 can also be electrically connected to each other, thus centralizing the converted electric energy together.

In addition, in the embodiment, the electrical energy converted by the foldable cover plate 2 is not directly configured to charge the movable device 1, but charge the energy storage device 3 provided in the tailstock 1b. The energy storage device 3 is a chargeable and dischargeable energy storage device 3 arranged in the tailstock 1b, such that the user may carry the energy storage device 3 and utilize the energy storage device 3 to provide energy for other devices. In the embodiment, the energy storage device 3 is detachably coupled to the tailstock 1b, thus removing the energy storage device 3 from the tailstock 1b easily, and thereby enriching the usage scenarios of the energy storage device 3. For example, the user can utilize the energy storage device 3 outdoors for lighting, boiling water, cooking, and so on. The energy storage device 3 is then placed back into the tailstock 1b after use and is electrically connected to the one-end cover assembly 10a, so that the electrical energy converted by the photovoltaic panels 11 in the plurality of cover assemblies 10 can be configured to energize the energy storage device 3 by the one-end cover assembly 10a, thus realizing energy saving and environmentally friendly purposes. In an another embodiment, the energy storage device 3 is non-detachably coupled to the tailstock 1b.

As above, the foldable cover plate 2 in the embodiment can not only cover the tailstock 1b, but also realize photovoltaic conversion, and charge converted electric energy to the energy storage device 3 in the tailstock 1b, thus realizing charging function, and thereby diversifying the functions of the foldable cover plate 2, and meeting the user's needs.

As illustrated in FIG. 2 again, in the embodiment, the movable device 1 includes the cockpit 1a and the tailstock 1b. The connection direction of the plurality of cover assemblies 10 is defined as an arrangement direction of the cockpit 1a of the movable device 1 and the tailstock 1b. The energy storage device 3 is arranged one side of the tailstock 1b away from the cockpit 1a. The one-end cover assembly 10a of the plurality of cover assemblies 10 is arranged at an end away from the cockpit 1a, and configured to be electrically connected to an energy storage device 3. In an another embodiment, connection direction of the plurality of cover assemblies 10 is defined as a direction perpendicular to the arrangement direction of the cockpit 1a of the movable device 1 and the tailstock 1b.

The cockpit 1a is a part of the movable device 1 that is driven by the user, which may also be referred to as a headstock. The tailstock 1b includes a side wall 11b away from the cockpit 1a. The side wall 11b of the tailstock 1b away from the cockpit 1a is capable of rotating to open the tailstock 1b from one side, so that the energy storage device 3 can be provided in the tailstock 1b away from the cockpit 1a, that is, the energy storage device 3 is arranged close to the side wall 11b capable of rotating, which is convenient for a user to pick and place the energy storage device 3. Exemplarily, in the embodiment, the energy storage device 3 is provided on a side of a bottom of the tailgate 1b adjacent to the sidewall 11b. The plurality of cover assemblies 10 are arranged sequentially in a direction from adjacent to the cockpit 1a to away from the cockpit 1a, so that the photovoltaic panels 11 in the embodiment of the one-end cover assembly 10a away from the cockpit 1a may be electrically connected to the energy storage device 3, thereby facilitating the installation and removal of the energy storage device 3 and the collapsible cover 2 by the user.

Figure 7:
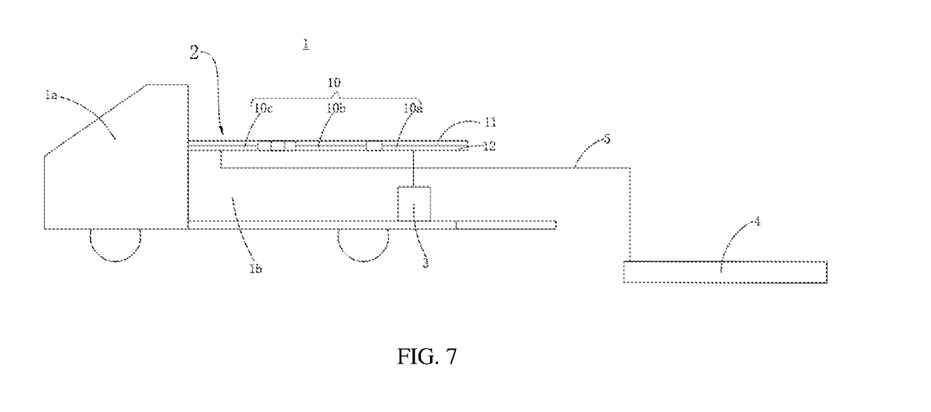
FIG. 7 is a schematic view of a cross-section of the foldable cover plate in another embodiment of the present application when applied to a movable device.

As illustrated in FIG. 7, FIG. 7 is a schematic view of a cross-section of the foldable cover plate in another embodiment of the present application when applied to a movable device. In the embodiment, an another-end cover assembly 10c of the plurality of cover assemblies 10 arranged adjacent to the cockpit 1a is configured to be electrically connected a movable solar panel 4.

The movable solar panel 4 is not the foldable cover plate 2 of the present application, but another type of solar panel that can be movable relative to the movable device 1. The movable solar panel 4 is also capable of photovoltaic conversion, and the movable solar panel 4 is movable, so that the user can carry the movable solar panel 4, for example, the user can place the movable solar panel 4 at ground for photovoltaic conversion when the user is outdoors. In other words, the foldable cover plate 2 provided in the present application is a fixed solar panel fixedly mounted on the movable device 1. The movable solar panel 4 is a user-added solar panel that can be placed an inside of the tailstock 1b; or can be placed an outside of the tailstock 1b; or can be placed an inside of the cockpit 1a. The movable device 1 and the movable solar panel 4 are provided independently of each other. The movable solar panel 4 is provided on at least of a rear side, a front side, a left side, and right side of the movable device 1. Exemplarily, in the embodiment, the movable solar panel 4 is provided on the rear side of the movable device 1. The movable solar panel 4 is movable relative to the movable device 1. In an another embodiment, the movable solar panel 4 is fixed relative to the movable device 1.

In the embodiment, the another-end cover assembly 10c of the plurality of cover assemblies 10 adjacent to the cockpit 1a is electrically connected to the movable solar panel 4, so that the number of solar panels can be increased and thus the charging efficiency can be improved.

Alternatively, when the another-end cover assembly 10c of the plurality of cover assemblies 10 adjacent to the cockpit 1a needs to be electrically connected to the movable solar panel 4, the one-end cover assembly 10a arranged at the rear end of the tailstock 1b may be folded first at this point, thereby making it easier for the user to electrically connect the another-end cover assembly 10c adjacent to the cockpit 1a to the movable solar panel 4. Of course, in other embodiments, the another-end cover assembly 10c adjacent to the cockpit 1a may not be folded to electrically connect the movable solar panel 4.

Figure 8:
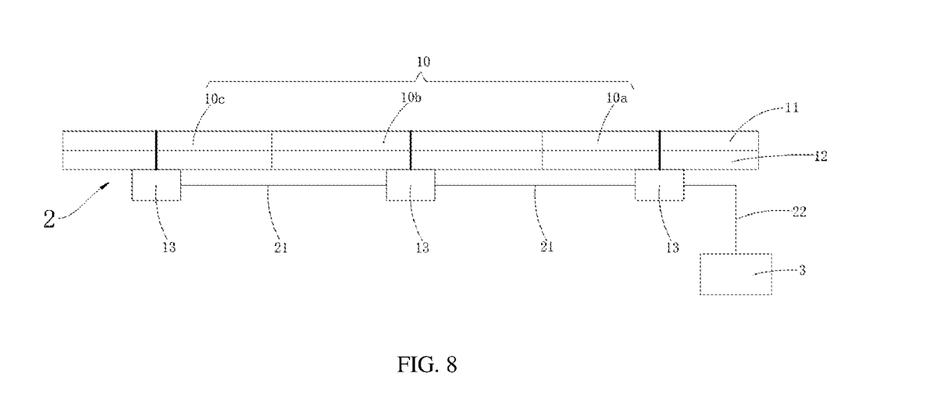
FIG. 8 is a schematic view of a cross-section of a foldable cover plate in an embodiment of the present application when the foldable cover plate is coupled to an energy storage device.

As illustrated in FIG. 8, FIG. 8 is a schematic view of a cross-section of a foldable cover plate in an embodiment of the present application when the foldable cover plate is coupled to an energy storage device. In the embodiment, one side of the substrate 12 of each of the cover assemblies 10 back from an associated photovoltaic panel 11 is provided with an interface 13 electrically connected to the associated photovoltaic panel 11. The foldable cover plate 2 further includes at least one first conductor component 21 and a second conductor component 22. Two opposite ends of each of the at least one first conductor component 21 are configured to be electrically connected to two associated interfaces 13 of the any two adjacent cover assemblies 10, respectively. One end of the second conductor component 22 is electrically connected to the interface 13 of the one-end cover assembly 10a, and an another end of the second conductor component 22 is configured to be electrically connected to the energy storage device 3.

When the foldable cover plate 2 is in the unfolded state, the photovoltaic panel 11 is provided above and the substrate 12 is provided below. In the embodiment, one side of the substrate 12 back from the photovoltaic panel 11 is provided with the interface 13 electrically connected to the associated photovoltaic panel, that is, the interface 13 is provided below the substrate 12, thus realizing the electrical connection of the photovoltaic panels 11 of the two adjacent cover assemblies 10 by the interface 13.

The foldable cover plate 2 may be further provided with the at least one first conductor component 21 and the second conductor component 22. The at least one first conductor component 21 and the second conductor component 22 have different functions, respectively. One end of each of the at least one first conductor component 21 is electrically connected to the interface 13 of one of the any two adjacent cover assemblies 10, and an another end of each of the at least one first conductor component 21 is electrically connected to the interface 13 of an another one of the any two adjacent cover assemblies 10. Thus, the photovoltaic panels 11 of the two adjacent cover assemblies 10 can be electrically connected together by the at least one first conductor component 21. Specifically, when the foldable cover plate 2 includes three cover assemblies 10, two first conductor components 21 are required. The three cover assemblies 10 are defined as a first cover assembly, a second cover assembly, and a third cover assembly. Exemplarily, in this embodiment, the first cover assembly is a one-end cover assembly 10a, the second cover assembly is a middle cover assembly 10b, and the third cover assembly is a another-end cover assembly 10c. One of the two first conductor components 21 is connected to an interface 13 of the first cover assembly and an interface 13 of the second cover assembly, and an another one of the two first conductor components 21 is connected to the interface 13 of the second cover assembly and an interface 13 of the third cover assembly. Thus, three cover assemblies 10 are electrically connected together by the two first conductor components 21.

In addition, one end of the second conductor component 22 is electrically connected to the interface 13 of the one-end cover assembly 10a arranged at one end, that is, one end of the second conductor component 22 is electrically connected to the interface 13 of the one-end cover assembly 10a away from the cockpit 1a, and the another end of the second conductor component 22 is configured to be electrically connected to the energy storage device 3. Thus, electrical energy converted by the foldable cover plate 2 can be transmitted to the energy storage device 3 by the second conductor component 22, thereby charging the energy storage device 3.

As above, the plurality of cover assemblies 10 can be connected together and charge the energy storage device 3 by the interfaces 13, the at least one first conductor component 21 and the second conductor component 22.

Alternatively, the first conductor component 21 and the second conductor component 22 may be of the same structure or may be of different structures. When the first conductor component 21 and the second conductor component 22 are of the same structure, the conductor components in different areas and having different functions are named differently.

Figure 9:
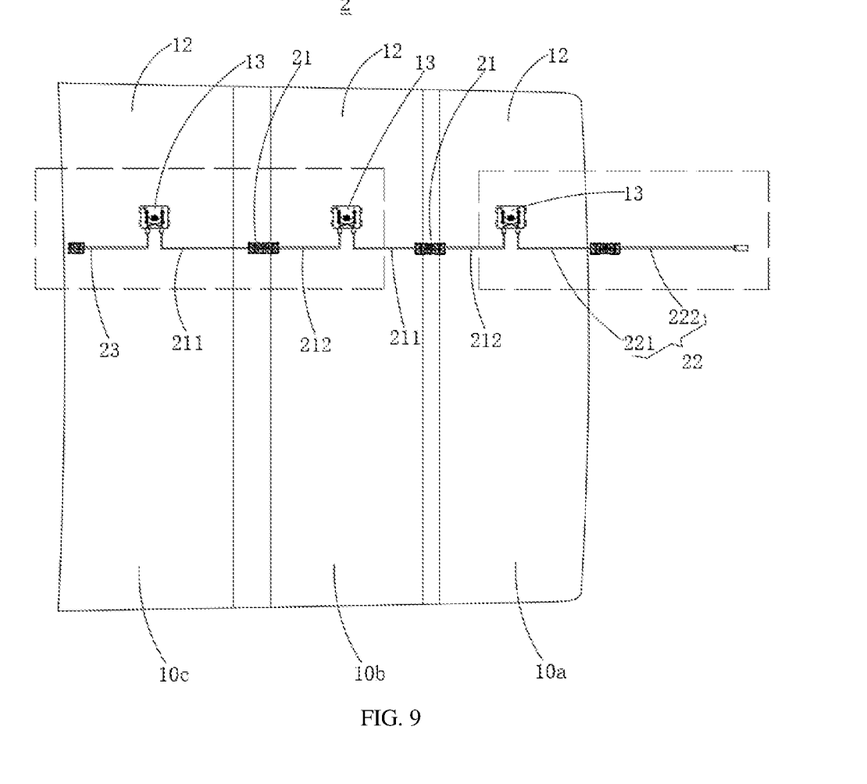
FIG. 9 is an elevation view of the foldable cover plate in an embodiment of the present application.
Figure 10:
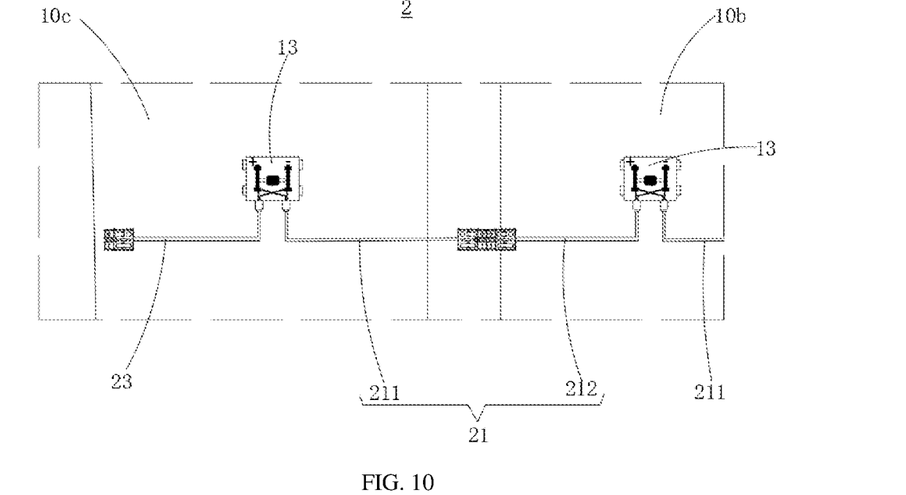
FIG. 10 is a partially enlarged schematic view of the foldable cover plate of FIG. 9.

As illustrated in FIG. 9 and FIG. 10, FIG. 9 is an elevation view of the foldable cover plate in an embodiment of the present application, and FIG. 10 is a partially enlarged schematic view of the foldable cover plate of FIG. 9. In the embodiment, each of the at least one first conductor component 21 includes a first conductor 211 and a second conductor 212. One end of the first conductor 211 is connected to the interface 13 of one of the any two adjacent cover assemblies 10, an another end of the first conductor 211 is connected to the second conductor 212, and one end of the second conductor 212 away from the first conductor 211 is connected to the interface 13 of an another one of the any two adjacent cover assemblies 10.

The foldable cover plate 2 further includes a third conductor component 23, one end of the third conductor component 23 is electrically connected to the interface 13 of the another-end cover assembly 10c, and an another end of the third conductor component 23 is electrically connected to the movable solar panel 4.

The first conductor component 21 is not a single conductor, but consists of two conductors, such as the first conductor 211 and the second conductor 212. One end of the first conductor 211 is connected to the interface 13 of one of the any two adjacent cover assemblies 10, one end of the second conductor 212 is connected to the interface 13 of an another one of the any two adjacent cover assemblies 10, and the another end of the first conductor 211 is connected to the another end of the second conductor 212. Thus, the first conductor 211 and the second conductor 212 can be configured to electrically connect two adjacent cover assemblies 10 together.

Specifically, when the foldable cover plate 2 includes the three cover assemblies 10, one end of the first conductor 211 of one of the at least one first conductor component 21 is electrically connected to the interface 13 of the first cover assembly, one end of the second conductor 212 of one of the at least one first conductor component 21 is electrically connected to the interface 13 of the second cover assembly, and the another end of the first conductor 211 of one of the at least one first conductor component 21 is electrically connected to the another end of the second conductor 212 of one of the at least one first conductor component 21. One end of the first conductor 211 of an another of the at least one first conductor component 21 is electrically connected to the interface 13 of the second cover assembly, one end of the second conductor 212 of an another of the at least one first conductor component 21 is electrically connected to the interface 13 of the third cover assembly, and the another end of the first wire 211 of an another of the at least one first conductor component 21 is electrically connected to the another end of the second conductor 212 of an another of the at least one first conductor component 21.

Alternatively, two adjacent cover assemblies 10 are detachably connected to each other. The first conductor 211 may be a two-core wire. A length of the first conductor 211 is substantially 500 mm. One end of the first conductor 211 is provided with a 75 mm red wire stripping and a 25 mm black wire toggle, thereby connecting to the positive and negative terminals of the interface 13 of one of the two adjacent cover assemblies 10. An another end of the first conductor 211 is connected to a 50 A Anderson plug. The second conductor 212 may also be the two-core wire. A length of the second conductor 212 is substantially 500 mm. One end of the second conductor 212 is provided with a 25 mm red wire stripping and a 75 mm black wire toggle, thereby connecting to the positive and negative terminals of the interface 13 of the another one of the two adjacent cover assemblies 10. An another end of the second conductor 212 is connected to a 50 A Anderson plug. Thus, the another end of the first conductor 211 and the another end of the second conductor 212 are electrically connected together by plugging the two Anderson plugs.

Alternatively, the embodiment may add the third conductor component 23, and one end of the third conductor component 23 is electrically connect to the interface 13 of the another-end cover assembly 10, that is, one end of the third conductor component 23 is electrically connect to the interface 13 of the another-end cover assembly 10 arranged adjacent to the cockpit 1a. An another end of the third conductor component 23 may be configured to be electrically connected to an external movable solar panel 4. In other words, the present embodiment may also add the third conductor component 23 at the interface 13 of the another-end cover assembly 10 adjacent to the cockpit 1a, thus achieving electrical connection of the movable solar panel 4 by the third conductor component 23. Alternatively, an Anderson plug may also be provided on the third conductor component 23, thus achieving electrical connection of the movable solar panel 4 by the Anderson plug. The third conductor component 23 may be configured to detachably connect to the movable solar panel 4.

Figure 11:
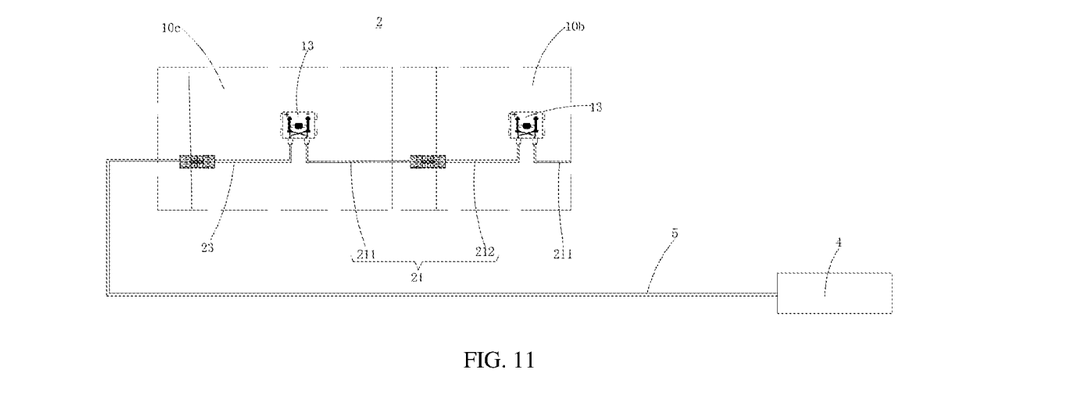
FIG. 11 is a schematic view of the foldable cover plate of FIG. 10 coupled to a movable solar panel by an electrical connecting line.

As illustrated in FIG. 11, FIG. 11 is a schematic view of the foldable cover plate of FIG. 10 coupled to a movable solar panel by an electrical connecting line. In the embodiment, the another end of the third conductor component 23 is also configured to connect one end of an electrical connecting line 5, and an another end of the electrical connecting line 5 is configured to connect the movable solar panel 4. The third conductor component 23 may be configured to detachably connect to the electrical connecting line 5, such that the movable solar panel 4 can be detachably connected to the movable device 1.

The embodiment may also be provided with the additional electrical connecting line 5, so that one end of the electrical connecting line 5 is electrically connected to the another end of the third conductor component 23, and the another end of the electrical connecting line 5 is electrically connected to the movable solar panel 4. In other words, since the movable solar panel 4 may be arranged on the ground to receive solar energy, the movable solar panel 4 may be farther away from the movable device 1, such that the foldable cover plate 2 in the embodiment is not directly connected to the movable solar panel 4 by the third conductor component 23, but is electrically connect the foldable cover plate 2 together by an extending wire, i.e., the electrical connecting line 5, thus facilitating the connection of the foldable cover plate 2 and the movable solar panel 4. As for a length of the electrical connecting line 5, it can be arranged and selected according to the demand.

Figure 12:
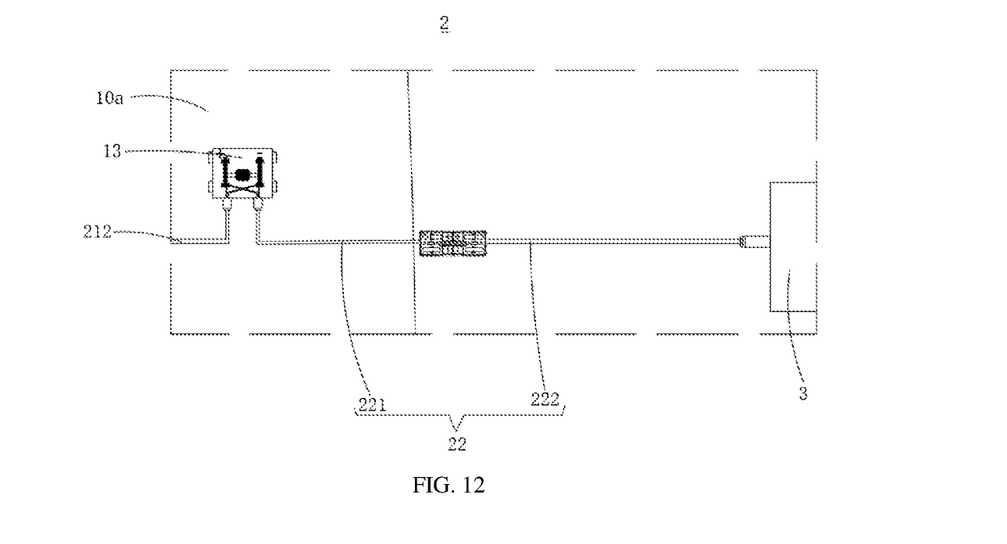
FIG. 12 is a partially enlarged schematic view of the foldable cover plate of FIG. 9 coupled to an energy storage device.

Referring together to FIG. 9 and FIG. 12, FIG. 12 is a partially enlarged schematic view of the foldable cover plate of FIG. 9 coupled to an energy storage device. In the embodiment, the second conductor component 22 includes a third conductor 221 and a fourth conductor 222. One end of the third conductor 221 is electrically connected to the interface 13 of the one-end cover assembly 10a, an another end of the third conductor 221 is electrically connected to the fourth conductor 222, and one end of the fourth conductor 222 away from the third conductor 221 is configured to be electrically connected to the energy storage device 3.

The second conductor component 22 is not a single conductor, but consists of two conductors, such as the third conductor 221 and the fourth conductor 222. One end of the third conductor 221 is connected to the interface 13 of one of the any two adjacent cover assemblies 10, the another end of third conductor 221 is connected to the another end of fourth conductor 222, one end of the fourth conductor 222 is connected to the energy storage device 3. Thus, the foldable cover plate 2 and the energy storage device 3 can be connected together by the third conductor 221 and the fourth conductor 222.

Alternatively, the third conductor 221 may be a two-core wire. A length of the third conductor 221 is substantially 500 mm. One end of the third conductor 221 is provided with a 75 mm red wire stripping and a 25 mm black wire toggle, thereby connecting to the positive and negative terminals of the interface 13 of the one-end cover assembly 10a. An another end of the third conductor 221 is connected to a 50 A Anderson plug. The fourth conductor 222 may also be the two-core wire. A length of the fourth conductor 222 is substantially 500 mm. One end of the fourth conductor 222 is connected to a 50 A Anderson plug, thus the Anderson plug of the fourth conductor 222 may be plugged to the Anderson plug of the third conductor 221. An another end of the fourth conductor 222 is connected to a 30 A Anderson plug configured to connect to the energy storage device 3.

In the embodiment, when the plurality of cover assemblies 10 are folded, the first conductor 211 and the second conductor 212 are capable of being connected together; or, the first conductor 211 and the second conductor 212 are capable of being separated from each other; and the second conductor component 22 is capable of being separated from the energy storage device 3. The first conductor 211 is non-detachably connected to the second conductor 212; or, the first conductor 211 is detachably connected to the second conductor 212. The second conductor component 22 is configured to be detachably connected to the energy storage device 3, thus enabling the energy storage device 3 to be removed from the movable device 1.

When it is necessary to open the opening 101b of the tailstock 1b, or to make the another-one cover assembly 10c adjacent to the cockpit 1a electrically connected to the movable solar panel 4, the cover assembly 10 may be folded. Since a distance between two adjacent cover assemblies 10 increases when the foldable cover plate 2 is folded, a length of the first conductor 211 and the second conductor 212 is made longer when unfolded, so that the first conductor 211 and the second conductor 212 can still be connected together even when the foldable cover plate 2 is folded. Alternatively, the first conductor 211 is first configured to be separated from the second conductor 212, and then the cover assembly 10 is configured to be folded. As for the second conductor component 22, which needs to be separated from the energy storage device 3, thus facilitating the separation of the one-end cover assembly 10 and the energy storage device 3 arrange away from the cockpit 1a.

Regarding the movable device 1, the cockpit 1a, the tailstock 1b, the energy storage device 3, and the foldable cover plate 2 have been described in detail above in the application, and the embodiment will not be repeated herein. The foldable cover plate 2 provided above in the application is applied to the movable device 1 provided in the embodiment, such that the foldable cover plate 2 not only can be configured to achieve the function of shielding the tailstock 1b, but also can be configured to achieve photovoltaic conversion, thus charging the energy storage device 3 in the tailstock 1b, and thereby diversifying the functions of the foldable cover plate 2.

As illustrated in FIG. 2 and FIG. 7, in the embodiment, the movable device 1 further includes the movable solar panel 4 and the electrical connecting line 5. The one-end cover assembly 10a of the foldable cover plate 2 arranged away from the cockpit 1a is electrically connected to the energy storage device 3, the another-end cover assembly 10c of the foldable cover plate 2 arranged adjacent to the cockpit 1a is electrically connected to one end of the electrical connecting line 5, and an another end of the electrical connecting line 5 is electrically connected to the movable solar panel 4.

With regard to the movable solar panel 4 and the electrical connecting line 5 of the present application has been described in detail above and the embodiment will not be repeated herein. In the embodiment, the another-end cover assembly 10c of the foldable cover plate 2 arranged adjacent to the cockpit 1a is electrically connected to the movable solar panel 4 by the electrical connecting line 5 to electrically connect the two, thus reducing the difficulty of connection between the another-end cover assembly 10c of the foldable cover plate 2 arranged adjacent to the cockpit 1a and the movable solar panel 4.

In the description of the application, it is to be understood that the terms "center", "longitudinal", "transverse", "length", "width", "thickness", "top", "bottom", "front", "back", "left", "right", "vertical", "horizontal", "top", "bottom", "inside", "outside," "clockwise," "counterclockwise," and the like indicate orientation or positional relationships based on those shown in the accompanying drawings, and are intended only to facilitate the description of the present application and to simplify the description They are not intended to indicate or imply that the device or element referred to must have a particular orientation, be constructed and operated in a particular orientation, and therefore are not to be construed as a limitation of the present application.

Furthermore, the terms "first" and "second" are used for descriptive purposes only and are not to be understood as indicating or implying relative importance or implicitly specifying the number of technical features indicated. Thus, a feature defined with "first", "second" may expressly or implicitly include one or more such features. In the description of the present application, "more than one" means two or more, unless otherwise expressly and specifically limited. In addition, the terms "including" and "having", and any variations thereof, are intended to cover non-exclusive inclusion.

For the purposes of the application, unless otherwise expressly provided and limited, the terms "mounting", "connecting", "linking", "fixing", etc. shall be broadly construed. For example, the terms may be connected, detachable, or integral. It can be mechanically connected or electrically connected. the terms may also be a direct connection or an indirect connection through an intermediate medium, a connection within two elements or an interactive relationship between two elements. For those of ordinary skill in the art, the specific meaning of the above terms in this application may be understood on a case-by-case basis.

The above detailed description of the contents provided in the embodiments of the present application and the exposition and explanation of the principles and embodiments of the present application are only used to help understand the method of the present application and its core ideas. However, the contents of this specification should not be construed as a limitation of the present application, and the person skilled in the art may make various modifications and variations to the present application without departing from the spirit and scope of the present application. These modifications and variations of the present application are within the scope of the claims of the present application and their technical equivalents.

What is claimed is:

1. A foldable cover plate, which is configured to be mounted to a tailstock of a movable device to cover or open an opening provided with the tailstock, comprising a plurality of cover assemblies rotationally connected in sequence, wherein the plurality of cover assemblies are continuously folded to form a coiled structure;

wherein each of the plurality of cover assemblies comprises a photovoltaic panel and a substrate configured to support the photovoltaic panel, the photovoltaic panel of each of the plurality of cover assemblies is arranged on an associated substrate, the photovoltaic panel of each of the plurality of cover assemblies is configured to absorb light energy and convert the light energy to electrical energy; any two adjacent cover assemblies of the plurality of cover assemblies are electrically connected to each other; and in a connection direction of the plurality of cover assemblies, a one-end cover assembly of the plurality of cover assemblies is configured to be electrically connected to an energy storage device removably arranged in the tailstock and away from a cockpit of the movable device to charge the energy storage device;

wherein the connection direction of the plurality of cover assemblies is defined as an arrangement direction of the cockpit and the tailstock, and the one-end cover assembly of the plurality of cover assemblies is arranged at an end away from the cockpit, and configured to be electrically connected to the energy storage device, an another-end cover assembly of the plurality of cover assemblies arranged at an end adjacent to the cockpit is configured to be electrically connected to a movable solar panel; one side surface of the substrate of each of the plurality of cover assemblies is provided with an associated photovoltaic panel, and an another side surface of the substrate of each of the plurality of cover assemblies faces away from the associated photovoltaic panel and is provided with an interface electrically connected to the associated photovoltaic panel, the foldable cover plate further comprises at least one first conductor component, an second conductor component, and a third conductor component, two opposite ends of each of the at least one first conductor component are configured to be electrically connected to two associated interfaces of the any two adjacent cover assemblies, respectively; one end of the second conductor component is electrically connected to the interface of the one-end cover assembly, and an another end of the second conductor component is configured to be electrically connected to the energy storage device; one end of the third conductor component is electrically connected to the interface of the another-end cover assembly, an another end of the third conductor component is electrically connected to the movable solar panel;

wherein each of the at least one first conductor component comprises a first conductor and a second conductor, one end of the first conductor is connected to the interface of one of the any two adjacent cover assemblies, an another end of the first conductor is connected to the second conductor, and one end of the second conductor away from the first conductor is connected to the interface of an another one of the any two adjacent cover assemblies;

wherein the second conductor component comprises a third conductor and a fourth conductor, one end of the third conductor is electrically connected to the interface of the one-end cover assembly, an another end of the third conductor is electrically connected to the fourth conductor, and one end of the fourth conductor away from the third conductor is configured to be electrically connected to the energy storage device;

wherein the third conductor component is configured to be electrically connected to the movable solar panel by an electrical connecting line, and the third conductor component is configured to be detachably connected to the electrical connecting line;

wherein the first conductor and the second conductor are removably plugged together by two 50 A anderson plugs; the third conductor component and the electrical connecting line are removably plugged together by two 50 A anderson plugs, and the third conductor and the fourth conductor are removably plugged together by two 50 A anderson plugs; and wherein the first conductor of each of the at least one first conductor component comprises two cables, and the two cables of the first conductor of each of the at least one first conductor component are connected to positive and negative poles of the interface of the one of the any two adjacent cover assemblies, respectively, the second conductor of each of the at least one first conductor component comprises two cables, and the two cables of the second conductor of each of the at least one first conductor component are connected to positive and negative poles of the interface of the another one of the any two adjacent cover assemblies, respectively, the third conductor of the second conductor component comprises two cables, and the two cables of the third conductor of each of the second conductor component are connected to positive and negative poles of the interface of the one-end cover assembly, respectively, and the third conductor component comprises two cables, and the two cables of the third conductor component are connected to positive and negative poles of the interface of the another-end cover assembly, respectively.

2. A movable device, comprising a cockpit, a tailstock, an energy storage device, and a foldable cover plate of claim 1, wherein the foldable cover plate is mounted to the tailstock, and the foldable cover plate is electrically connected to the energy storage device to charge the energy storage device.

* * * * *